H. R. GEER.
ROLLING MILL.
APPLICATION FILED FEB. 14, 1920.
1,364,989.
Patented Jan. 11, 1921.
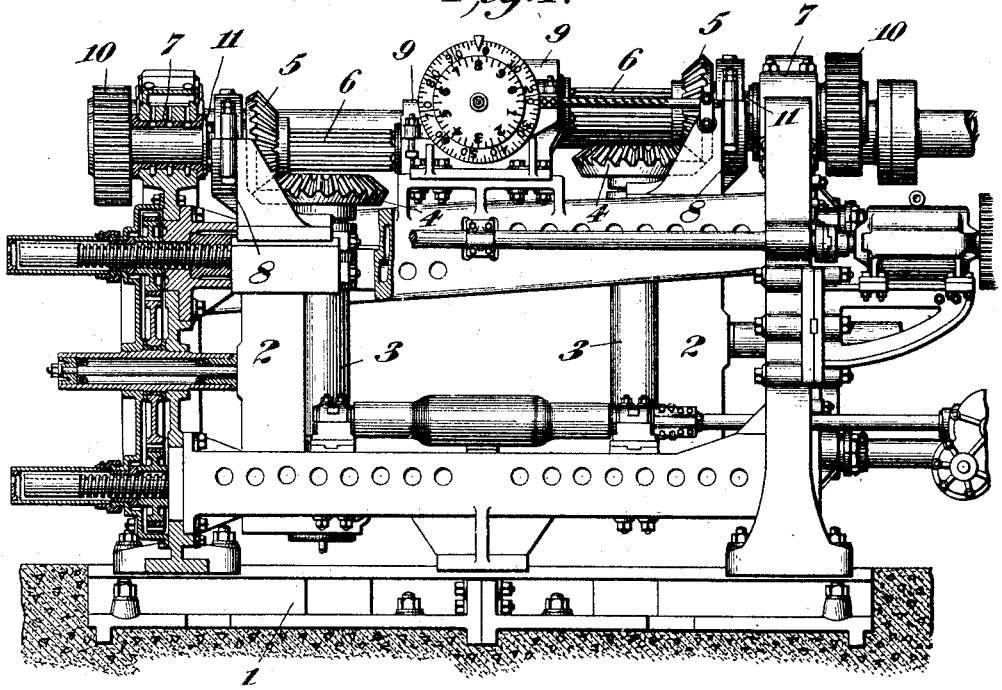
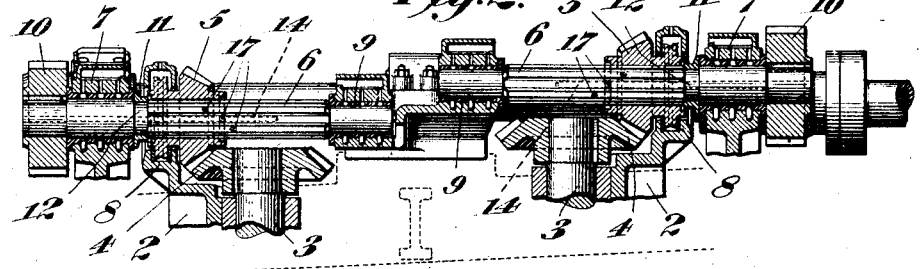
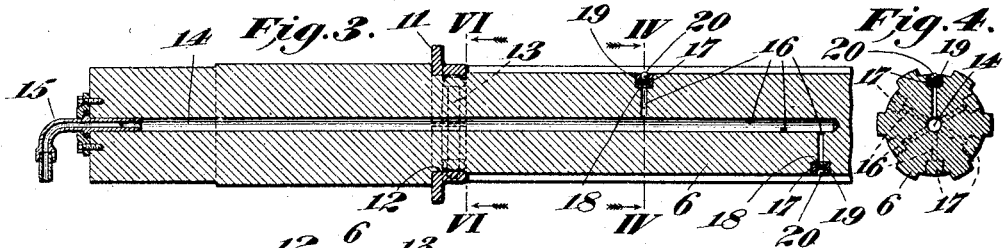
INVENTOR
Harry R. Geer.
BY
Geo. E. Thackray
ATTORNEY
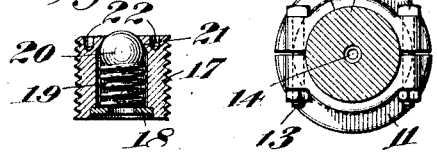

UNITED STATES PATENT OFFICE.

HARRY R. GEER, OF JOHNSTOWN, PENNSYLVANIA.

ROLLING-MILL.

1,364,989.  Specification of Letters Patent.  Patented Jan. 11, 1921.

Application filed February 14, 1920. Serial No. 358,783.

*To all whom it may concern:*

Be it known that I, HARRY R. GEER, a citizen of the United States, and a resident of the city of Johnstown, county of Cambria, and State of Pennsylvania, have invented certain new and useful Improvements in Rolling-Mills; and I do hereby declare the following to be a full, clear, and exact description of the invention, such as will enable others skilled in the art to which it appertains to make and use the same.

My invention relates to improvements in the particular class or type of rolling mill known in the art as a universal rolling mill, and is designed to provide an improved arrangement of the vertical rolls thereof and their driving connections.

One of the particular objects of my invention is to provide for the vertical rolls a strong, rigid and durable driving arrangement that will enable close and ready adjustment of these rolls and in particular afford ready access for the removal of the rolls from and the return of the same or others to the mill.

My invention provides a separate driving shaft at the upper end of each roll. The driving shafts are placed at different levels and carry sliding bevel gears that mesh with overlapping bevel gears on the rolls, thus enabling the rolls to be brought nearer each other to form desired passes of any width. The sliding bevel gears which are adapted to rotate with the driving shafts are mounted in bearings carried by the roll housings and in moving along the driving shafts actuate automatic lubricating devices contained therein, thus insuring a minimum of friction and wear. Side and central end journal bearings are provided for the driving shafts, on the outer ends of which are mounted outboard or overhung spur gears engaging spur gears on the main driving shaft.

A split collar is provided which fits an annular groove on the driving shaft of each roll and bears against the inside face of the side journal bearing, thereby acting as a thrust ring to restrain longitudinal motion of the driving shaft. Upon removal of this split collar the driving shaft can be withdrawn through the side journal bearing, thereby simplifying the removal of the rolls.

Having thus given a general description of my invention, I will now, in order to make the matter more clear, refer to the annexed sheet of drawings which forms part of this specification and in which like characters refer to like parts.

Figure 1 is a front elevation of the vertical rolling mechanism of a universal rolling mill illustrating the application of my invention.

Fig. 2 is a vertical longitudinal sectional elevation of the shaft mechanism for driving the vertical rolls of a universal rolling mill.

Fig. 3 is a vertical longitudinal section of one of the driving shafts drawn to a larger scale.

Fig. 4 is a transverse section taken on the line IV—IV of Fig. 3.

Fig. 5 is a detail view in vertical section of one of the valves controlling the supply of lubricant to the outside of one of the driving shafts.

Fig. 6 is a vertical transverse sectional elevation taken on the line VI—VI of Fig. 3.

Referring now to the characters of reference on the drawings:—1 represents a part of a rolling mill which has the vertical roll housings 2 that carry the vertical rolls 3. The vertical rolls 3 carry at their upper ends the bevel gears 4 which mesh with the bevel gears 5 mounted in the bearings 8 on the vertical roll housings 2. The bevel gears 5 are adapted to rotate with and slide longitudinally back and forth on the driving shafts 6, as the distance between the rolls is varied. The driving shafts 6 are carried in the side journal bearings 7 and the central end journal bearings 9. Each driving shaft 6 carries on its outer end the outboard or overhung spur gears 10 which engage corresponding gears on the main drive shaft which has, in the preferred embodiment of my invention, an independent driving means.

The split collars 11 are mounted in the annular grooves 12 of the driving shafts 6 and are secured thereto by the bolts 13. The split collars 11 act as thrust rings against the inner face of the side journal bearings 7 and thus prevent longitudinal motion of the driving shafts 6. Removal of the split collars 11 allows the driving shafts 6 to be withdrawn from the bevel gears 5 and through the side journal bearings 7. The vertical rolls 3 may then be released from their housings 2 and readily removed from the mill.

Each of the driving shafts 6 contains a longitudinal lubricant duct 14 fed through an outside sealed connecting pipe 15 connecting with a lubricant reservoir, not shown, adapted to supply lubricant as needed. Leading from the longitudinal duct 14, at intervals, are the branch ducts 16 which supply lubricant to the driving shafts 6. The feeding of the lubricant is automatic as the ball valves 20 are opened when the bevel gears 5 slide over and depress them against the valve springs 19. The ball valves 20 and the valve springs 19 are contained in the valve casings 17 which have the valve seats 21 and contain the washers 18. The valve casings 17 have holes 22 in their tops whereby, with a spanner wrench, they can be screwed into or out of the enlarged and tapped mouths of the branch ducts 16.

The advantages of my invention result from providing a separate driving shaft for each roll, these driving shafts being at the same ends of the rolls. In the preferred embodiment of my invention the driving shafts are placed at the upper ends of the rolls to prevent foreign matter, such as scale, etc., from interfering with the bearings and driving mechanism. Also each shaft is so supported as to prevent bending or sagging and by placing the shafts one above the other interference of the gear connections is avoided, thereby obviating the use of auxiliary or intermediate rolls.

One of the particular advantages of my invention results from providing the driving shafts with the outboard or overhung gears and the split collars which together with said gears furnish very simple and convenient means for removing the driving shafts, thereby providing ready access for the removal and return of the rolls. Furthermore the automatic lubricating device provided for the driving shafts insures a minimum of friction and wear.

Although I have shown and described my invention in considerable detail, I do not wish to be limited to the exact and specific details thereof, as shown and described, but may use such modifications in, substitutions for, or equivalents thereof, as are embraced within the scope of my invention, or as pointed out in the claims.

Having thus described my invention, what I claim and desire to secure by Letters Patent is:—

1. In a rolling mill with vertical rolls, a driving shaft for each vertical roll, an overhung gear mounted on each driving shaft and adapted to rotate the same, and a removable split collar mounted on each driving shaft, constituting means whereby said driving shaft may be readily withdrawn to afford access to the roll.

2. In a universal rolling mill, driving shafts for the vertical rolls, an overhung gear mounted on one end of each driving shaft and adapted to rotate the same, and a removable retaining ring mounted on each of said driving shafts, constituting means whereby said driving shafts may be readily removed from the mill to give access to the vertical rolls.

3. In a universal rolling mill, a pair of adjustable vertical rolls actuated by driving shafts geared thereto, an outboard gear mounted on each driving shaft and adapted to rotate the same, and a removable retaining ring mounted on each of said driving shafts, providing means whereby said driving shafts may be readily removed from the mill to give access to the vertical rolls.

4. In a rolling mill, adjustable vertical rolls, driving shafts therefor, each of said driving shafts having a plurality of different diameters, an overhung gear mounted on each driving shaft and adapted to rotate the same, and a removable thrust collar mounted on each driving shaft, providing means whereby said driving shafts may be quickly removed from the mill to afford access to the rolls.

5. In a rolling mill, adjustable vertical rolls, driving shafts geared thereto and provided with a plurality of integral portions of different diameters, a journal bearing for each driving shaft adapted to receive the portion of greatest diameter, an overhung gear and a split collar mounted on each of said driving shafts on the opposite sides of and abutting against said bearing, each of said overhung gears being adapted to rotate the driving shaft on which it is mounted, and said split collar providing means whereby each of said driving shafts may be quickly withdrawn through its said journal bearing to furnish access to the rolls.

6. In a universal rolling mill, driving shafts geared to the vertical rolls and provided with a plurality of integral portions of different diameters, an overhung gear mounted on each of said driving shafts and adapted to rotate the same, a split collar mounted on each of said driving shafts, and a journal bearing for each of said driving shafts through which, after removing the split collar, the driving shafts can be withdrawn, thereby providing access to the vertical rolls.

7. In a rolling mill, adjustable vertical rolls, each provided with a gear at one end, driving shafts for the vertical rolls provided with a plurality of integral portions of different diameters, a sliding gear splined on each driving shaft and meshed with the gear on the corresponding vertical roll, an outer journal bearing for each driving shaft through which one end of the driving shaft projects, an overhung gear mounted on the projecting end of each driving shaft and adapted to rotate the same, a split collar mounted on each driving shaft just inside the outer journal bearing and abutting thereagainst, and a journal bearing for the other end of each driving shaft.

8. In a universal mill, driving shafts for the vertical rolls, a sliding gear splined on each of said driving shafts and adapted to mesh with a gear mounted on one end of the corresponding vertical roll, an overhung gear mounted on one end of each driving shaft and adapted to rotate the same, a split collar mounted on each driving shaft, an outer bearing for each driving shaft in which is journaled that portion of the driving shaft between the overhung gear and the split collar, and a journal bearing for the other end of each driving shaft.

In witness whereof I hereunto affix my signature.

HARRY R. GEER.